United States Patent
Cannon et al.

(10) Patent No.: US 7,610,291 B2
(45) Date of Patent: Oct. 27, 2009

(54) LOGICAL GROUPING AND MANAGEMENT OF REDUNDANT OBJECTS IN STORAGE SYSTEMS

(75) Inventors: David Maxwell Cannon, Tucson, AZ (US); Colin Scott Dawson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/206,346

(22) Filed: Aug. 17, 2005

(65) Prior Publication Data

US 2007/0043733 A1 Feb. 22, 2007

(51) Int. Cl.
G06F 17/30 (2006.01)
(52) U.S. Cl. .................... 707/10; 707/204; 709/203; 709/219
(58) Field of Classification Search ................ None
See application file for complete search history.

(56) References Cited

U.S. PATENT DOCUMENTS

| | | | |
|---|---|---|---|
| 5,202,982 A * | 4/1993 | Gramlich et al. ............... 707/2 |
| 5,627,990 A | 5/1997 | Cord et al. |
| 5,644,766 A | 7/1997 | Coy et al. |
| 5,729,743 A | 3/1998 | Squibb |
| 5,732,265 A | 3/1998 | Dewitt et al. |
| 5,778,395 A | 7/1998 | Whiting et al. |
| 6,020,885 A * | 2/2000 | Honda ........................ 715/757 |
| 6,073,142 A * | 6/2000 | Geiger et al. ............... 715/205 |
| 6,584,497 B1 | 6/2003 | Case et al. |
| 6,615,225 B1 | 9/2003 | Cannon et al. |

(Continued)

FOREIGN PATENT DOCUMENTS

CN 1533136 9/2004

(Continued)

OTHER PUBLICATIONS

"Tivoli Storage Manager Version 3.7.3 & 4.1: Technical Guide," IBM Technical Support Organization, Document No. SG24- 6110-00, Sep. 2000, Chapter 3, pp. 81-110, Chapter 6, pp. 195-200.*

(Continued)

Primary Examiner—Hung T Vy
Assistant Examiner—Andalib F Lodhi
(74) Attorney, Agent, or Firm—Rabindranath Dutta; Konrad Raynes and Victor LLP (57) ABSTRACT

Provided are a method, system, and article of manufacture, wherein a determination is made that an object corresponding to a first client node has to be stored. A further determination is made as to whether the object has already been sent to a server node by a second client node, wherein the sent object is stored in the server node and is represented by a first entry, and wherein objects and representations of objects stored in the server node form a plurality of groups. The server node receives the object from the first client node, in response to determining that the object has not already been stored in the server node by the second client node. A second entry representing the object is stored at the server node, wherein the second entry references the first entry, in response to determining that the object has already been stored in the server node by the second client node.

15 Claims, 9 Drawing Sheets

U.S. PATENT DOCUMENTS

| | | | |
|---|---|---|---|
| 6,829,637 | B2 | 12/2004 | Kokku et al. |
| 7,215,743 | B2 | 5/2007 | Creamer et al. |
| 2002/0065892 | A1* | 5/2002 | Malik .................. 709/206 |
| 2003/0105716 | A1 | 6/2003 | Sutton, Jr. et al. |
| 2003/0172130 | A1* | 9/2003 | Fruchtman et al. ........ 709/219 |
| 2004/0088382 | A1 | 5/2004 | Therrien et al. |
| 2004/0199521 | A1 | 10/2004 | Anglin et al. |
| 2004/0227962 | A1 | 11/2004 | Xia |
| 2006/0117021 | A1* | 6/2006 | Sidney et al. ............ 707/10 |

FOREIGN PATENT DOCUMENTS

| | | |
|---|---|---|
| WO | WO 01/95140 A2 | 12/2001 |

OTHER PUBLICATIONS

"Fundamentals of Database System", by Elmasri/Navathe, Second Edition, 1994, Section 23.6.1, pp. 722-723.*

U.S. Application entitled "Method, System and Program for Grouping Objects", U.S. Appl. No. 10/120,015, filed Apr. 10, 2002 by inventors C. Bolik, D.M. Cannon, C.S. Dawson, A.H. Hochberg, M.A. Kaczmarski, B.R. Smith and C. Zaremba.

U.S. Application entitled "Method, System and Program for Managing Groups of Objects When there are Different Group Types", U.S. Appl. No. 10/410,072, filed Apr. 7, 2003 by inventors M.J. Anglin, D.M. Cannon, M.A. Haye and A.H. Hochberg.

U.S. Application entitled "Management of Redundant Objects in Storage Systems", IBM Docket No. SJO920050032US1, U.S. Appl. No. not yet assigned, filed Aug. 17, 2005 by inventors D.M. Cannon, C.S. Dawson, R.C. Edwards, Jr., M.A. Kaczmarski, and C. Zaremba.

U.S. Application entitled "Elimination of Redundant Objects in Storage Systems", IBM Docket No. SJO920050034US1 U.S. Appl. No. not yet assigned, filed Aug. 17, 2005 by inventors D.M. Cannon, C.S. Dawson and R.C. Edwards, Jr.

J.D. Jones et al., "Checking Scheme for Compares in a Queuing System", IBM Corporation, Technical Disclosure Bulletin, vol. 19, No. 2, Jul. 1976, pp. 591-593.

Leins et al. "Tivoli Storage Manager", IBM Technical Guide, 3.71 & 4.1, SG24-6110-00, p. 81-110 of Chapter 3, p. 195-200 of Chapter 6. China IDS (SJO920050035CN1_IDS_Mar. 7, 2008).

* cited by examiner

LOGICAL GROUPING AND MANAGEMENT OF REDUNDANT OBJECTS IN STORAGE SYSTEMS

BACKGROUND

1. Field

The disclosure relates to a method, system, and article of manufacture for the logical grouping and management of redundant objects in storage systems.

2. Background

A storage management application, such as IBM* Tivoli* Storage Manager* (TSM), may be implemented on a storage management server. The storage management application may manage storage requirements for a plurality of client nodes that are coupled to the storage management server via a network.

*IBM, Tivoli, and Tivoli Storage Manager are trademarks or registered trademarks of IBM Corporation.

The storage management application may create and manage a repository for data and programs that are backed up, archived, migrated, or otherwise copied from the client nodes to the storage management server. The storage management server may store data objects, such as files, in one or more storage pools and may use a database stored in the storage management server for tracking information about the stored data objects.

The storage management application may perform incremental backup, incremental archiving, migration, or incremental copying of data from the client nodes to the storage management server. For example, if the storage management application comprises a backup application then the backup application may perform incremental backup operations in which files are backed up only if the files have changed since a previous, periodic full backup, where the periodic full backups may be made on a weekly, monthly or some other periodic basis. TSM extends incremental backup by using a "progressive incremental backup" in which objects are backed up once and then never backed up again unless the objects undergo modifications on a client node. The progressive incremental approach for backups, archiving, or copying of data, etc., may reduce the amount of data that has to be copied or moved to the storage management server from the client nodes, and can reduce network traffic and storage space requirements over the incremental approach for backups, archiving, or copying of data. The progressive incremental backup approach may use a database that tracks information about every stored object and the location at which each object is stored.

In certain computing environments, different client nodes may store the same files in the storage management server. For example, client nodes may have the same operating system files or different people working on the same project may store the same document locally on different client nodes. The storage of the same data object in different client nodes may introduce redundancy for backup operations because the same files may be backed up and stored on the storage management server from different client nodes, and may lead to inefficiencies even in systems using the progressive incremental approach. While the following description describes embodiments with reference to a backup of data, it is understood that alternative embodiments may be utilized for archiving of data, migration of data, etc.

Objects in a storage management system may be related. It may be desirable for the storage management server to track the relationship between objects by maintaining logical groups of related files. Depending on the relationship, various types of groups may be supported in storage management systems. For example, objects may form a delta-base group in which a base object is backed up and a delta object that represents a change to the base object is stored subsequent to the base. The delta object may also be referred to as a subfile and may not be useful if the corresponding base object is deleted. Additionally, objects may form a peer group in which the peer group becomes invalid if any object belonging to the peer group is deleted.

SUMMARY OF THE DESCRIBED EMBODIMENTS

Provided are a method, system, and article of manufacture, wherein a determination is made that an object corresponding to a first client node has to be stored. A further determination is made as to whether the object has already been sent to a server node by a second client node, wherein the sent object is stored in the server node and is represented by a first entry, and wherein objects and representations of objects stored in the server node form a plurality of groups. The server node receives the object from the first client node, in response to determining that the object has not already been stored in the server node by the second client node. A second entry representing the object is stored at the server node, wherein the second entry references the first entry, in response to determining that the object has already been stored in the server node by the second client node.

In certain embodiments, at least one object of a group associated with the first client node has been stored by the second client node.

In additional embodiments, group relationships between the objects stored on the server node are preserved while reducing redundancy among the objects stored on the server node.

In further embodiments, a plurality of objects stored by the first and the second client nodes form at least one peer group, wherein if one object of a peer group is deleted then the peer group is invalidated.

In still further embodiments, a plurality of objects stored by the first and the second client nodes form at least one delta-base group, and wherein a delta-base group comprises a base object and at least one delta object that indicates a change to the base object.

In certain embodiments, node identifiers corresponding to client nodes are maintained. Object identifiers corresponding to the objects are also maintained. Additionally, group identifiers corresponding to the plurality of groups are maintained. Furthermore, at least one group type corresponding to the plurality of groups is maintained. The plurality of groups in a database may be processed based on the node identifiers, the object identifiers, the group identifiers, and the at least one group type.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. For example, while the following description describes embodiments with reference to a backup of data, it is understood that alternative embodiments may be utilized for archiving of data, migration of data, etc.

Redundant Objects in Storage Management Systems

In certain computing environments, in which a plurality of client nodes are coupled to a storage management server, different client nodes may store the same file. For example, different client nodes may include the same operating system files or different people working on the same project may store local copies of the same document on different computers. This may introduce redundancy for backup operations because the same files may be backed up and stored on the storage management server from a plurality of client nodes, leading to time and space inefficiencies even in systems that use progressive incremental backup.

Certain embodiments reduce redundant objects in a storage management system, while at the same time maintaining logical group relationships among the objects in the storage management system.

Reduction of Redundant Objects While Maintaining Group Relationships

Figure 1:
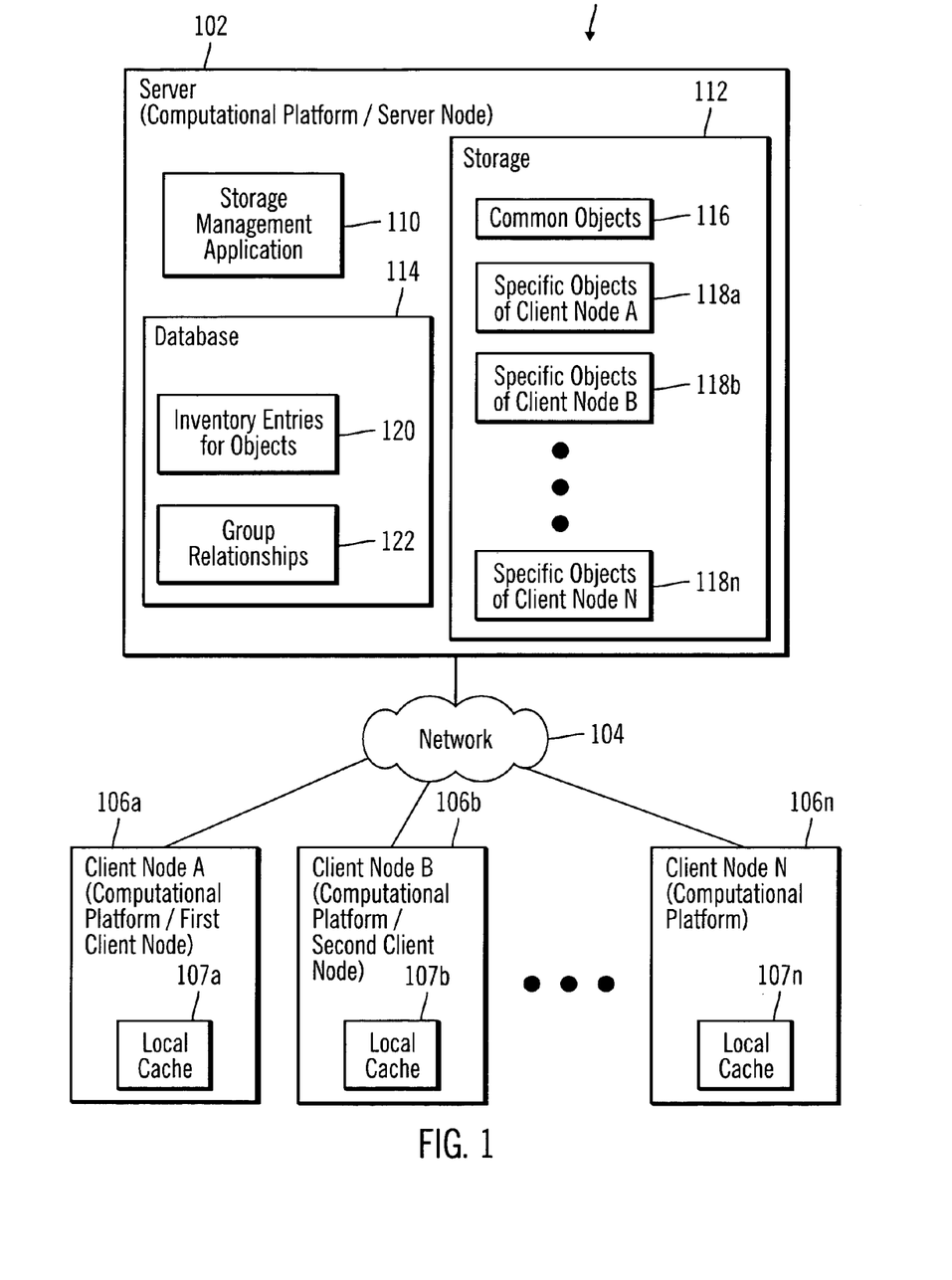
FIG. 1 illustrates a block diagram of a computing environment in accordance with certain embodiments.

FIG. 1 illustrates a block diagram of a computing environment 100 in accordance with certain embodiments. At least one computational platform 102, where in certain embodiments the computational platform 102 may comprise a server, is coupled via a network 104 to a plurality of computational platforms 106*a*, 106*b*, . . . , 106*n*, where in certain embodiments the plurality of computational platforms 106*a* . . . 106*n* may comprise client nodes. In certain embodiments, the client nodes 106*a*, 106*b* . . . 106*n* may include local cache 107*a*, 107*b*, . . . 107*n* respectively. While FIG. 1 indicates the computational platform 102 to be a server, and the computational platforms 106*a* . . . 106*n* to be client nodes, in alternative embodiments the computational platforms 102, 106*a* . . . 106*n* may comprise any suitable computational platform, including those presently known in the art, such as, personal computers, workstations, mainframes, midrange computers, network appliances, palm top computers, telephony devices, blade computers, hand held computers, etc. The server 102 may also be referred to as a server node and the client nodes 106*a* . . . 106*n* may also be referred to as clients. Alternative embodiments may be implemented in a computing environment that is not based on a client-server paradigm. For example alternative embodiments may be implemented in a peer-to-peer networked environment.

The coupling of the server 102 to the client nodes 106*a* . . . 106*n* may be direct or may be via any network 104 known in the art, such as a Storage Area Network (SAN), Local Area Network (LAN), Wide Area Network (WAN), the Internet, an Intranet, etc.

A storage management application 110, a storage 112, and a database 114 may be coupled to the server 102. While FIG. 1 shows the storage 112 to be inside the server, in certain embodiments, the storage 112 may be external to the server 102 and may comprise storage units that are coupled to the server via a network. For the purposes of the application, the server 102 may be considered to encompass the storage 112 whether or not the storage 112 is internal or external to the server 102. In certain embodiments, the server 102 may be used for backup processing. In other embodiments, the server 102 may be used for archiving, migration or copying of data. The database 114 may be external or internal to the server 102.

The storage 112 may include a data structure referred to as common objects 116 that represents shared objects of the plurality of client nodes 106*a* . . . 106*n*. In addition, the storage 112 also includes data structures representing specific objects 118*a*, 118*b*, . . . 118*n* corresponding to the client nodes 106*a*, 106*b*, . . . 106*n* respectively.

The storage management application 110 may allow some or all objects from the plurality of client nodes 106*a* . . . 106*n* to be backed up to the storage 112 and stored as the common objects 116 of the plurality of client nodes 106*a* . . . 106*n*. Similarly, the storage management application 110 may also allow certain objects from the client nodes 106*a* . . . 106*n* to be backed up to the storage 112 and stored as the specific objects 118*a* . . . 118*n* corresponding to the client nodes 106*a* . . . 106*n*. For example, in certain embodiments the objects from client node 106*b* that are not found in the common objects 116 may be sent to the storage 112 and stored as the specific objects 118*b* of client node 106*b*.

The database 114 includes inventory entries 120 corresponding to the common objects 116 and the specific objects 118*a* . . . 118*n*. The storage management application 110 may query the database 114 for inventory information corresponding to one or more objects of any client node 106*a* . . . 106*n*. The database 114 also includes group relationships 122 among objects that are backed up by the plurality of client nodes 106*a* . . . 106*n* to the server 102.

Therefore, FIG. 1 illustrates certain embodiments in which the storage management application 110 allows the plurality of client nodes 106*a* . . . 106*n* to share common objects 116 while at the same time maintaining group relationships 122 among the objects backed up to the server 102 by the client nodes 106*a* . . . 106*n*.

Figure 2:
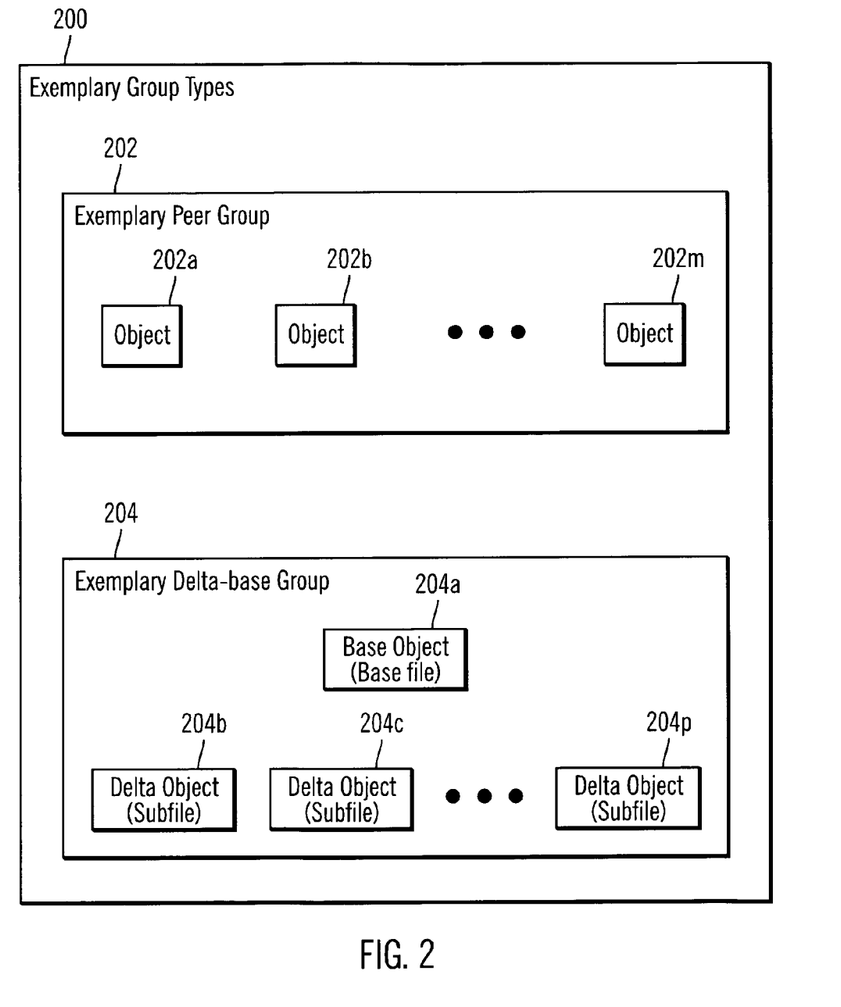
FIG. 2 illustrates an exemplary peer group and an exemplary delta-base group, in accordance with certain embodiments.

FIG. 2 illustrates exemplary group types 200 including an exemplary peer group 202 and an exemplary delta-base group 204, in accordance with certain embodiments. The exemplary group types 200 may be implemented in the server 102 of the computing environment 100.

In certain embodiments, the exemplary peer group 202 includes a plurality of objects 202*a*, 202*b*, . . . 202*m* that have been backed up by one or more of the plurality of client nodes 106*a* . . . 106*n*. If any of the objects 202*a* . . . 202*m* are deleted then the exemplary peer group 202 becomes invalid. The objects of the exemplary peer group 202 may correspond to objects sent by a single client node or may correspond to objects sent by a plurality of client nodes.

In certain embodiments, the exemplary delta-base group 204 may comprise a base object 204a, and one or more delta objects 204b, 204c, . . . 204p. The delta objects 204b . . . 204p are stored subsequent to the base object 204a and represent changes to the base object 204a. For example, in certain embodiments, the delta object 204b may represent a first incremental change to the base object 204a, and the delta object 204c may represent a second incremental change to the base object 204a. If the base object 204a is deleted, then the delta objects 204b . . . 204n may not be useful. In certain embodiments, base and delta objects within a delta-base group may have been sent by a single client node or by a plurality of client nodes.

Therefore, FIG. 2 illustrates certain environments in which the storage management application 110 maintains group relationships among objects backed up in the server 102 by one or more client nodes 106a . . . 106n. In certain embodiments, other group types besides the peer group 202 and the delta-base group 204 may be established among objects backed up to the server 102 by one or more client nodes 106a . . . 106n.

Figure 3:
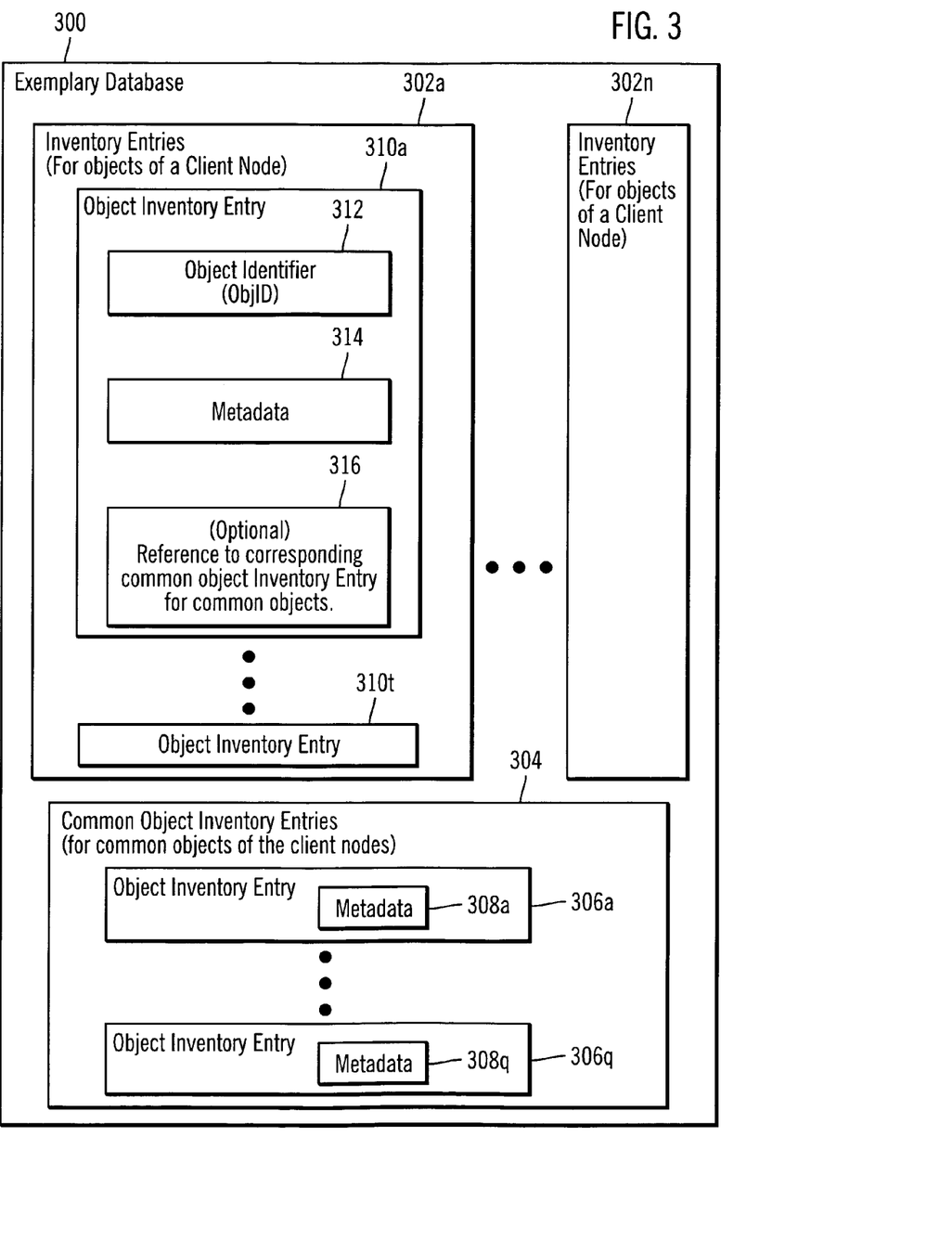
FIG. 3 illustrates an exemplary database for maintaining inventory entries for objects, in accordance with certain embodiments.

FIG. 3 illustrates an exemplary database 300 for maintaining inventory entries for objects, in accordance with certain embodiments. The exemplary database 300 may correspond to the database 114 implemented in the computing environment 100 of FIG. 1.

The exemplary database 300 may include inventory entries 302a . . . 302n for objects of the client nodes 106a . . . 106n. In FIG. 3, data structures of the inventory entries 302a for objects of the client node 106a are shown for illustration. In addition the exemplary database 300 may include data structures for common object inventory entries 304, where the common object inventory entries 304 are for the common objects 116 of the plurality of client nodes 106a . . . 106n. The common object inventory entries 304 may include object inventory entries 306a . . . 306q corresponding to the common objects 116 of the plurality of client nodes 106a . . . 106n, where the object inventory entries 306a . . . 306q may include corresponding metadata, such as metadata 308a . . . 308q. The metadata 308a . . . 308q may include group relationship for objects. In certain embodiments, group relationships could be maintained using inventory entries for an individual client node rather than for the common objects. Such embodiments may allow each node to have different group relationships for the same common objects.

The inventory entries 302a for client node 106a may include a plurality of object inventory entries 310a . . . 310t corresponding to objects of the client node 106a. An exemplary object inventory entry 310a may include an object identifier ObjID 312 that identifies the corresponding object. The exemplary object inventory entry 310a may also include metadata 314 for the corresponding object, where the metadata 314 may include the group relationship for the corresponding object. In certain embodiments, an individual object can belong to a plurality of groups for the same node.

In addition to the object identifier 312 and the metadata 314, the object inventory entry 310a may also include a reference 316 to a corresponding object inventory entry in the common object inventory entries 304, if the object was backed up in the common objects 116 of the plurality of client nodes 106a . . . 106n. The exemplary database 300 reduces redundancy of nodes by storing references 316 to corresponding object inventory entries for the common objects 116 that may be shared by one or more of the client nodes 106a . . . 106n. In alternative embodiments, the exemplary database 300 may be structured differently.

Figure 4:
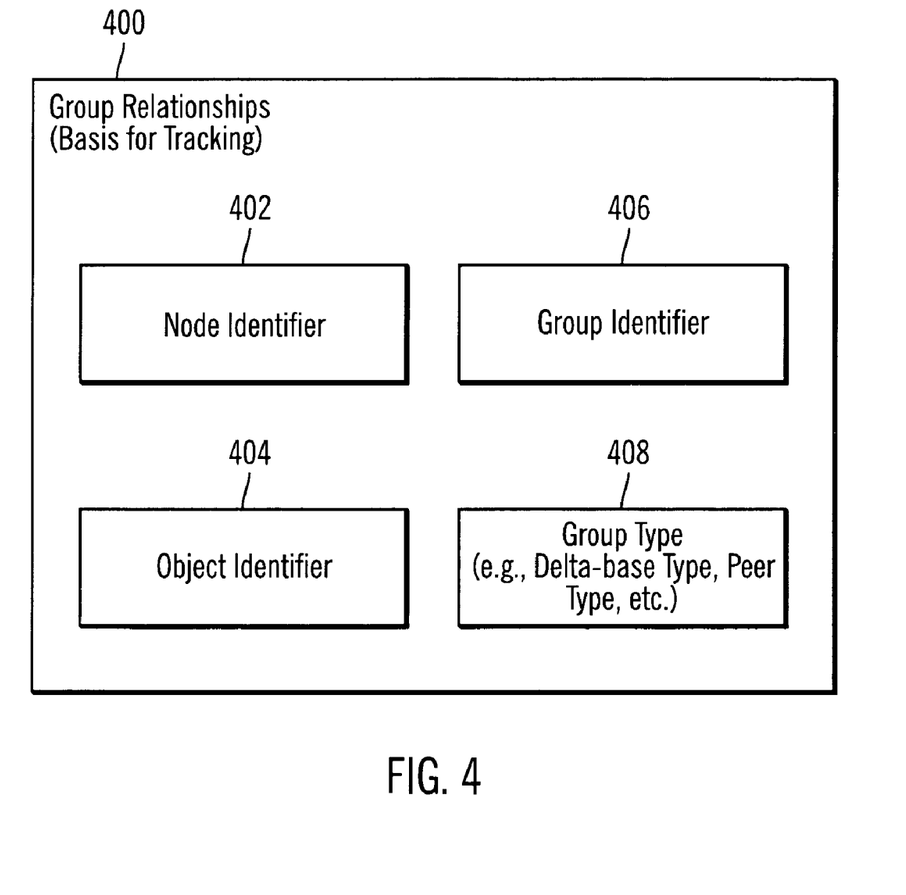
FIG. 4 illustrates exemplary elements for tracking group relationships, in accordance with certain embodiments.

FIG. 4 illustrates exemplary elements for tracking group relationships in the computing environment 100, in accordance with certain embodiments. The exemplary elements for tracking group relationships may be implemented in the database 114 and the storage 112 of the server 102.

The group relationships 400 among objects may be tracked by using data structures corresponding to a node identifier 402, an object identifier 404, a group identifier 406 and a group type 408. The node identifier 402 may denote the client node corresponding to an object having the object identifier 404. The group identifier 406 may represent the group to which the object with object identifier 404 belongs. The group type 408 may represent the type of the group, e.g., delta-base group, peer group, etc., to which the object with object identifier 404 belongs, i.e., the group-type 408 represents the type of a group represented by the group identifier 406. In certain embodiments, an object may belong to a plurality of groups for the same node. Furthermore, groups can be nested. For example, a peer group could be nested within a parent peer group. As another example, a peer group could include a delta object, thereby creating a nesting relationship in which the delta-base group corresponding to the delta object is nested within the peer group.

In an exemplary embodiment, the node identifier 402 may correspond to an unique identifier for client node 106a, the object identifier 404 may correspond to an unique identifier for object 202a, where the identity of the group to which the object 202a belongs is represented by the group identifier 406. The group type 408 of the group represented by the group identifier 406 may be a peer group. In other embodiments, different data structures may be used to represent the group relationships.

Figure 5:
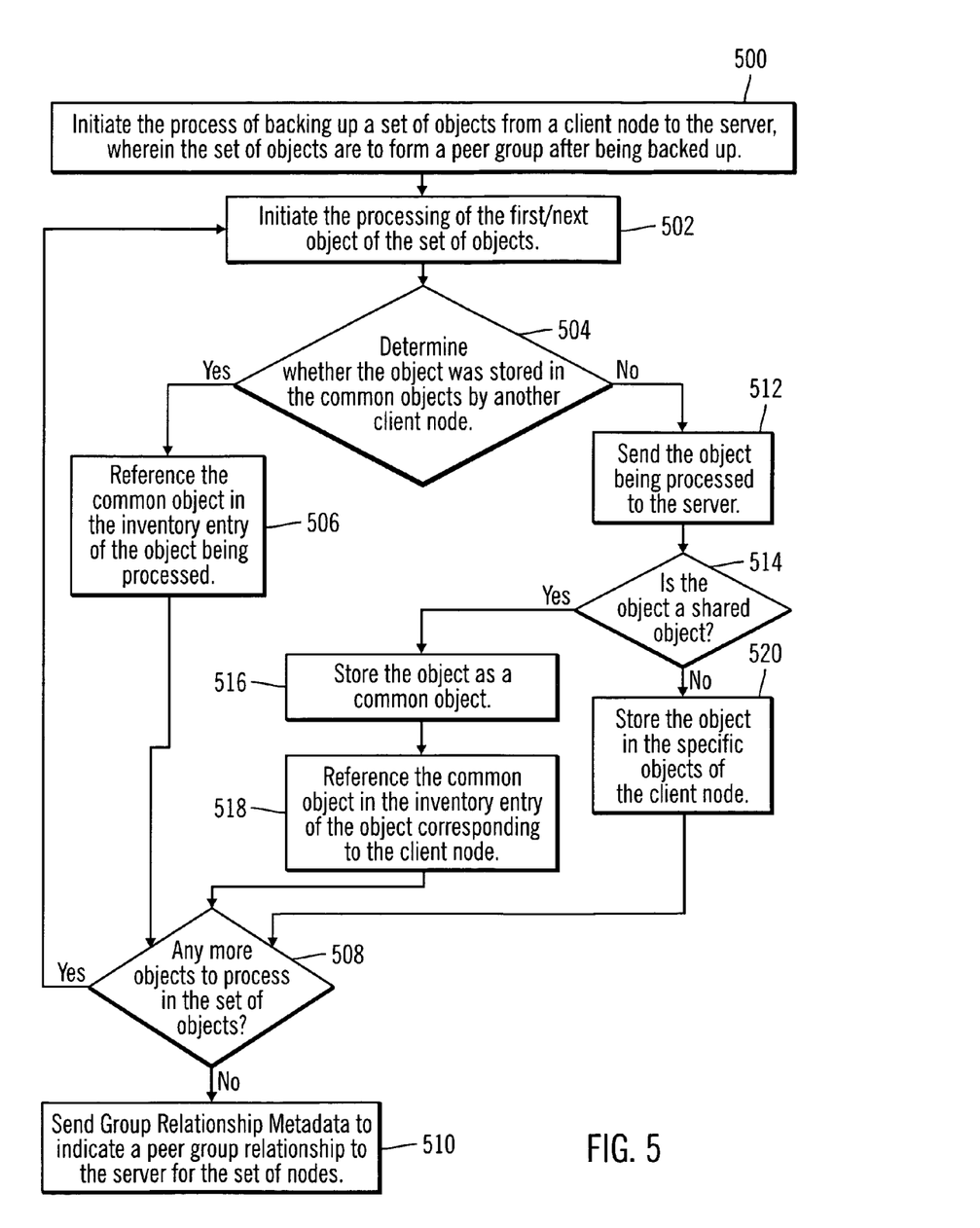
FIG. 5 illustrates a flowchart for the processing of peer groups, in accordance with certain embodiments.

FIG. 5 illustrates a flowchart for the processing of peer groups, in accordance with certain embodiments. The operations illustrated in the flowchart of FIG. 5 may be implemented in the computing environment 100.

Control starts at block 500, where the process of backing up a set of objects from a client node to the server 102 is initiated, wherein the set of objects are to form a peer group after being backed up. In certain embodiments, the set of objects may be backed up to the server 102 from one or more client nodes 106a . . . 106n.

Control proceeds to block 502, where the storage management application 110 initiates the processing of the first object of the set of objects. For example, the set of objects may include objects 202a . . . 202m and the storage management application may first process object 202a.

The storage management application 110 determines (at block 504) whether the object being processed was stored in the common objects 116 by another client node. For example, the client node 106a may be attempting to back up the object 202a, and the storage management application 110 may determine whether the data included in object 202a has already been stored in the common objects 116 by any of the other client nodes 106b . . . 106n.

If the storage management application 110 determines (at block 504) that the object being processed was stored in the common objects 116 by another client node, then the storage management application 110 causes the object to reference (at block 506) the common object in the inventory entry of the object being processed. For example, reference 316 may be used to reference a common object for an object with an object identifier 312. Control proceeds to block 508, where the storage management application 110 determines whether there are any remaining objects that have not been processed. If so, control returns to block 502 for processing the next object. If not, then all objects in the set of objects have been processed, and the client node may send (at block 510) metadata 314 to the server 102 to indicate a peer group relationship among the objects of the set of objects.

If the storage management application 110 determines (at block 504) that the object being processed was not stored in the common objects 116 by another client node, then the client node sends (at block 512) the object being processed to the server 102. The storage management application 110 determines (at block 514) whether the object is a shared object. If so, then the object is stored (at block 516) as a common object in the common objects 116, and the common object is referenced (at block 518) in the inventory entry of the object corresponding to the client node. Control proceeds to block 508 to determine whether there are more objects to process.

If the storage management application 110 determines (at block 514) that the object is not a shared object, then the storage management application 110 stores (at block 520) the object in the specific objects of the client node. For example, the client node 106a may store the object in the specific objects 118a. Control proceeds to block 508 to determine whether there are more objects to process.

Therefore, FIG. 5 illustrates certain embodiments in which a client node creates peer groups whose member objects may have stored by the client node or by one or more other client nodes. If a member object has been stored by one of the other client nodes then a reference to the corresponding common object suffices and the data included in the member object is not sent to the server 102 by the client node. As a result, redundant files are not stored in the server, while at the same time peer group relationship among member objects is maintained by sending the group relationship metadata to the server 102. In certain embodiments, a group may belong to a client node, and the client node may be regarded as having backed up the objects within the group, even if the objects were actually sent and stored by another client node.

Figure 6:
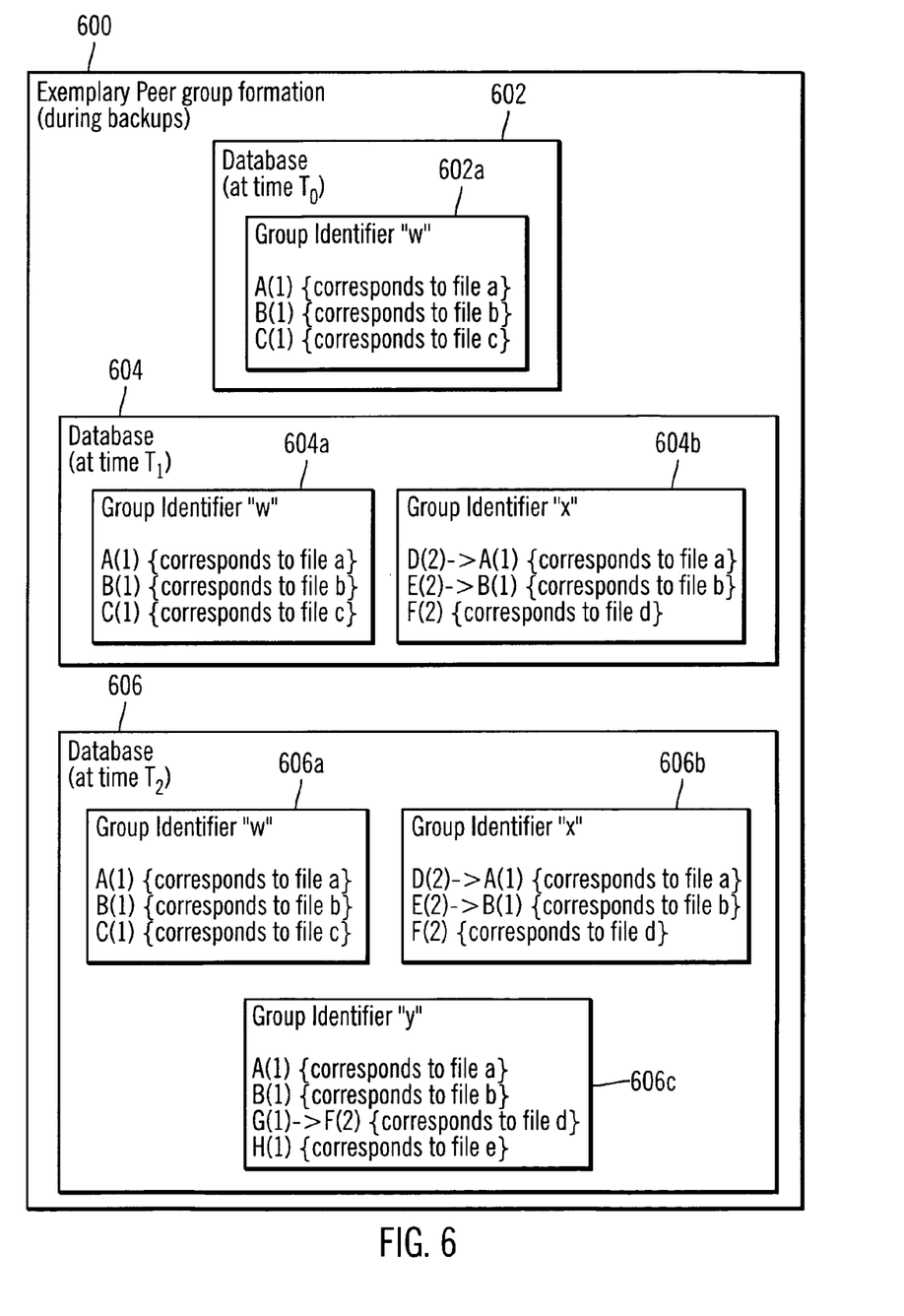
FIG. 6 illustrates exemplary database entries for an exemplary processing of peer groups, in accordance with certain embodiments.

FIG. 6 illustrates exemplary database entries for an exemplary processing of peer groups in the computing environment 100, in accordance with certain embodiments. The database entries of FIG. 6 may be generated in part as a result of the operations described in FIG. 5.

A sequence of entries in the database 114 that exhibit peer group relationships are shown in the block labeled exemplary peer group formation 600. If there are two client nodes denoted by node "1" and node "2" and "A", "B" represent object identifiers, then the terminology B(1) signifies that the object with object identifier "B" belongs to node "1", regardless of whether node "1" actually sent and stored the object. The terminology B(1)→A(2) signifies that the object with object identifier "B" belongs to node "1", but was stored as object "A" by node "2". Blocks 602, 604, 606 illustrate group relationships stored in the database 114 at times $T_0$, $T_1$, and $T_2$ respectively.

At time $T_0$ node "1" backs up three files named "a", "b" and "c" which become objects A(1), B(1) and C(1) and are assigned as members of a peer group with group identifier "w" 602a.

At time $T_1$ node "2" backs up files "a" and "b", which are the same as the files backed up by node "1" at time $T_0$, and also backs up object "d". Since "a" and "b" are already stored in the server 102, files "a" and "b" are not sent from node "2", but are designated as objects D(2)→A(1) and E(2)→B(1) respectively. Since "d" is new, object "d" is sent to the server by node "2" and becomes object F(2). All three objects D(2)→A(1), E(2)→B(1), and F(2) are assigned as members of a peer group with group identifier "x" 604b. Additionally, group identifier "w" 604a already exists in the database 604 at time $T_1$.

At time $T_2$, node "1" backs up files "a", "b" and "d" that are identical to the files already backed up with the same names, and also backs up a new file "e". Files "a", "b" and "d" are not resent, but are designated as objects A(1), B(1), and G(1)→F (2). Object "e" is stored by node "1" and is represented as object H(1). A group relationship is established showing that A(1), B(1), G(1)→F(2), and H(1) are members of a peer group with group identifier "y" 606c. In addition, group identifier "w" 606a, and group identifier "x" 606b already exist in the database at time $T_2$.

After a certain period of time, node "1" may need to restore the peer group backed up at time $T_2$. In such a case, the storage management application 110 sends A(1), B(1), F(2), H(1) to node "1".

Therefore, FIG. 6 illustrates that in certain embodiments objects already sent to the server by one node may be linked via references from objects being backed up by other nodes, without resending the objects. The objects and representations of objects on the server may form groups. During restoration of files to a client node, the references may be used to retrieve the data included in the files.

Figure 7:
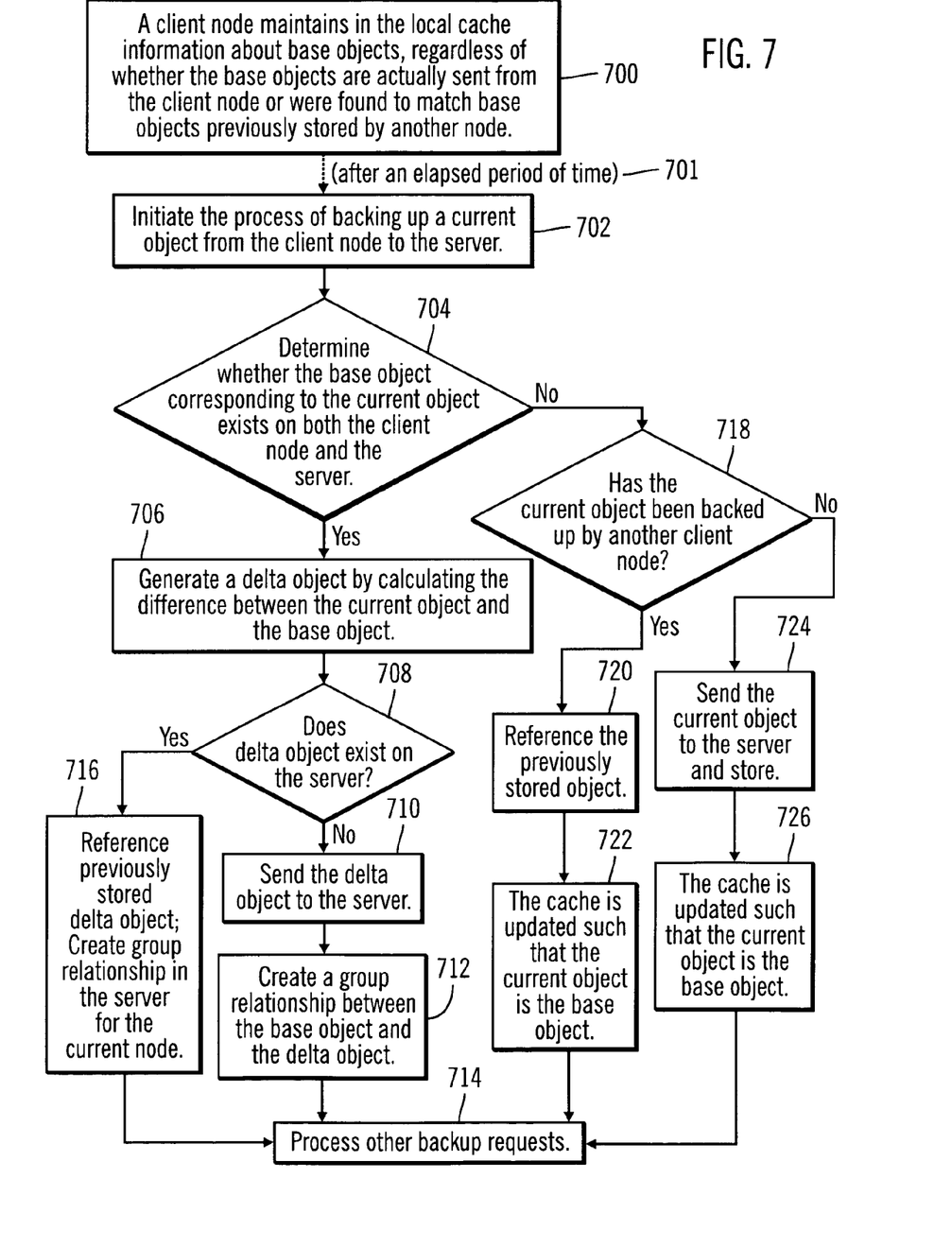
FIG. 7 illustrates a flowchart for the processing of delta-base groups, in accordance with certain embodiments.

FIG. 7 illustrates a flowchart for the processing of database groups 204 in the computing environment 100, in accordance with certain embodiments.

Control starts at block 700, where an exemplary client node 106a maintains in the local cache 107a information about base objects 204a, regardless of whether the base objects 204a are actually sent from the client node 106a or were found to match base objects previously stored by another node 106b . . . 106n. After an elapsed period of time 701, the process of backing up a current object from the client node 106a to the server 102 is initiated (at block 702).

The client node 106a determines (at block 704) whether the base object corresponding to the current object exists on both the client node 106a and the server 102. For example, the base object may be an original version of a file and the current object may be an updated version of the file.

If the client node 106a determines (at block 704) that the base object corresponding to the current object exists on both the client node 106a and the server 102 then the client node 106a generates (at block 706) a delta object by calculating the difference between the current object and the base object. For example, in certain embodiments, the change in the file between the updated version of the file and the original version of the file may be the delta object.

The storage management server 110 determines (at block 708) whether the delta object exists on the server 102. If not, then the client node 106a sends (at block 710) the delta object to the server 102 and creates (at block 712) a group relationship between the base object and the delta object. Control proceeds to block 714 for processing additional backup requests.

If at block 708, the storage management application 110 determines that the delta object exists on the server 102, then the storage management application 110 creates (at block 716) a reference to the previously stored delta object and creates a group relationship in the server 102 for the current node. Subsequently, control proceeds to block 714 for processing additional backup requests.

If the client node 106a determines (at block 704) that the base object corresponding to the current object does not exist on both the client node 106a and the server 102, then the storage management application 110 determines (at block 718) whether the current object has been backed up by another client node. If so, then the current object is not resent to the server, but the previously stored object is referenced (at block 720) and the local cache 107a is updated (at block 722), such that the current object is the base object for client node 106a. Control proceeds to block 714 for processing additional backup requests.

If the storage management application 110 determines (at block 718) that the current object has not been backed up by another client node, then the client node 106a sends (at block 724) the current object to the server 102 for storage, i.e., the data for the current object is sent to the server 102. The client node 106a updates (at block 726) the local cache 107a, such that the current object is the base object. Control proceeds to block 714 for processing additional backup requests.

Therefore, FIG. 7 illustrates certain embodiments in which a client node maintains a local cache of information about backed-up objects referred to as base objects, regardless of whether the base objects are sent from the client node or are found to match objects previously stored by another client node. During a subsequent backup, if it is determined that a base file has changed, a difference is calculated between the current file and the base file, and this difference is sent to the server and stored for the client node if this difference has not already been stored as a delta file on the server by another node. If the base file was stored by another client node, an inventory entry references the inventory entry for the base object stored in the common objects 116. Certain embodiments, allow for differences between objects on various client nodes, without the need for sending the entire object to the server from each client node. Additionally, group relationships among objects are preserved. Therefore, FIG. 7 illustrates certain embodiments in which delta-base group relationships are maintained, wherein member objects of the delta-base group may have been stored by one or more client nodes. For example, a delta-base group could have a base object stored by one node and a plurality of delta objects that were stored by various other nodes.

To illustrate the operations of FIG. 7, an exemplary sequence of operations for maintaining delta-base relationships are provided below.

1. Time $T_0$: Node "1" backs up file project.ppt which is assigned object identifier A. Node "1" stores project.ppt in the local cache of node "1". The database 114 includes an inventory entry for A(1). Node "1" sends project.ppt to node "2" via electronic mail.
2. Time $T_1$: File project.ppt is modified on node "1" and backed up. Node "1" computes a difference between the current instance of project.ppt and the instance backed up at time $T_0$. The difference is backed up and stored as object B(1). The database 114 shows that B(1) is a delta object based on A(1).
3. Time $T_2$: Node "2" backs up project.ppt received via the electronic mail from node "1", where the project.ppt received in the electronic mail was backed up by node "1" at time $T_0$. During the backup of project.ppt at time $T_2$, no instances of project.ppt are found for node "2", but two instances of project.ppt are found for node "1", the two instances being A(1) and B(1). A determination is made that the current version of project.ppt on node "2" is identical to A(1). Therefore, there is no need to send the object from node "2" to the server. However, the database 114 is updated to show C(2)→A(1) and node "2" stores project.ppt in the local cache.
4. Time $T_3$: Node "1" sends the latest version of project.ppt to node "2" in an electronic attachment which is detached to replace the previous instance of project.ppt. Node "2" performs a backup, which determines that project.ppt on node "2" is identical to B(1), and that node "2" has a cache entry corresponding to the base for B(1). There is no need to send project.ppt from node "2". Database entries are created to show that D(2)→B(1) and that D(2) is a delta object based on C(2)→A(1).
5. Time $T_4$: File project.ppt is modified on node "2" and then backed up. The system does not find this instance of project.ppt, so a new delta object is created as E(2). The database 114 shows E(2) is a delta object based on C(2)→A(1).
6. Time $T_5$: Node "2" emails project.ppt to node "1", which detaches the file and then performs a backup. The backup determines that the version of project.ppt on node "1" is identical to E(2) and that node "1" has the base for E(2) which is A(1). There is no need to send project.ppt from node "1". However, entries are created on the database 114 to indicate that F(1)→E(2) and that F(1) is based on A(1).
7. Time $T_6$: The user on node "2" sees all instances of project.ppt stored for node "2", including D(2), which is selected for restoration. The server 102 checks the database 114 to determine that D(2) corresponds to B(1) and is based on C(2) which corresponds to A(1). The system sends A(1) and B(1) to node "2", which uses the objects to reconstruct the desired version of project.ppt.

Therefore, the above exemplary sequence of operations includes six files on the two nodes where each file is represented by a metadata entry. Of the three stored objects, one is a base object and two are delta objects. In certain embodiments, at least one object of a group associated with one client node is stored by another client node.

Figure 8:
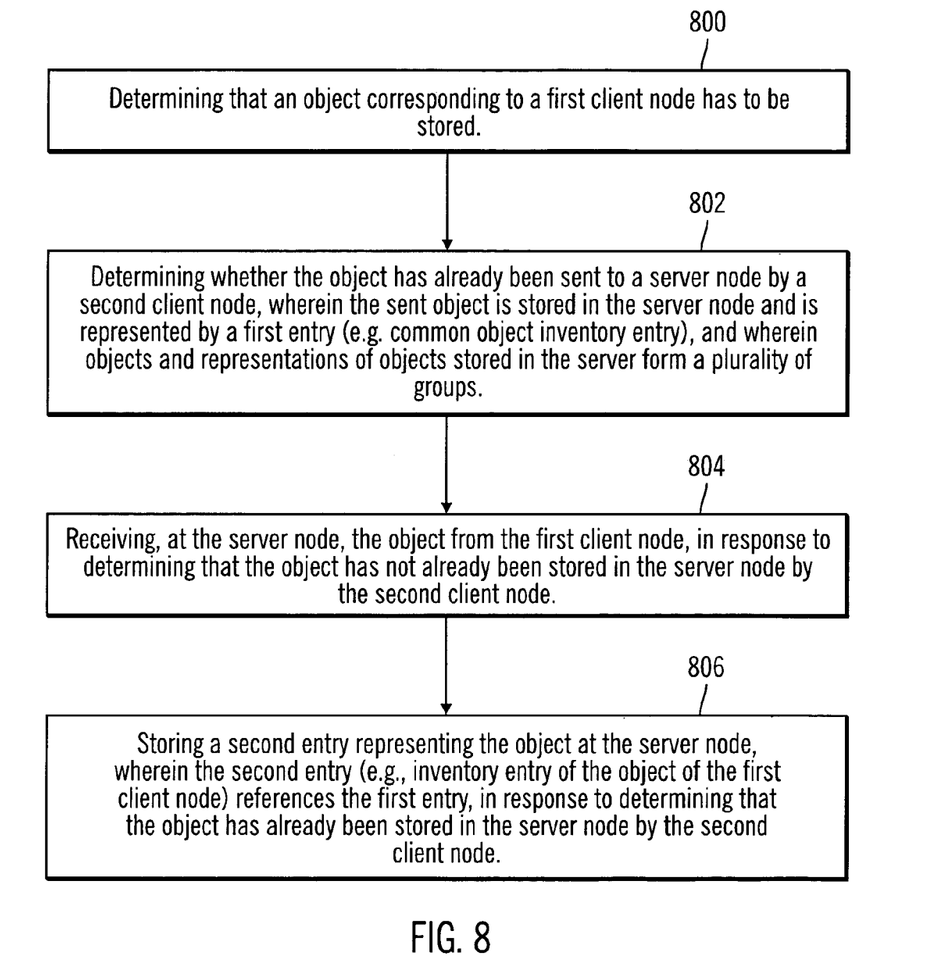
FIG. 8 illustrates a flowchart for logical grouping and management of redundant objects in a storage system, in accordance with certain embodiments.

FIG. 8 illustrates a flowchart for logical grouping and management of redundant objects in the computing environment 100, in accordance with certain embodiments.

Control starts at block 800, where a determination is made that an object corresponding to a first client node, such as any of the client nodes 106a ... 106n, has to be stored, i.e., backed up, on a server node 102. A determination is made (at block 802) as to whether the object has already been sent to a server node 102 by a second client node, wherein the sent object is stored in the server node 102 and is represented by a first entry (e.g. common object inventory entry 306a), and wherein objects and representations of objects stored in the server 102 form a plurality of groups.

The server node 102 receives (at block 804) the object from the first client node, in response to determining that the object has not already been stored in the server node 102 by the second client node. The server node 102 stores (at block 806) a second entry representing the object, wherein the second entry (e.g., inventory entry of the object of the first client node) references the first entry, in response to determining that the object has already been stored in the server node 102 by the second client node. Reference to a first and a second client node in the description of FIG. 8 does not imply that embodiments are restricted to groups with objects stored by only two client nodes. Groups can be formed with objects that have been stored by any number of client nodes.

Certain embodiments allow groups to include objects that were stored by multiple nodes. For example, a particular node could manage a peer group containing objects that were stored by five other nodes in addition to any objects stored by the particular node. Similarly, a delta-base group could have a base object stored by one node and multiple delta objects that were stored by various other nodes.

In certain embodiments, at least one object of a group associated with the first client node have been stored by the second client node. Additionally, group relationships between the objects stored on the server are preserved while reducing redundancy among the objects stored on the server.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
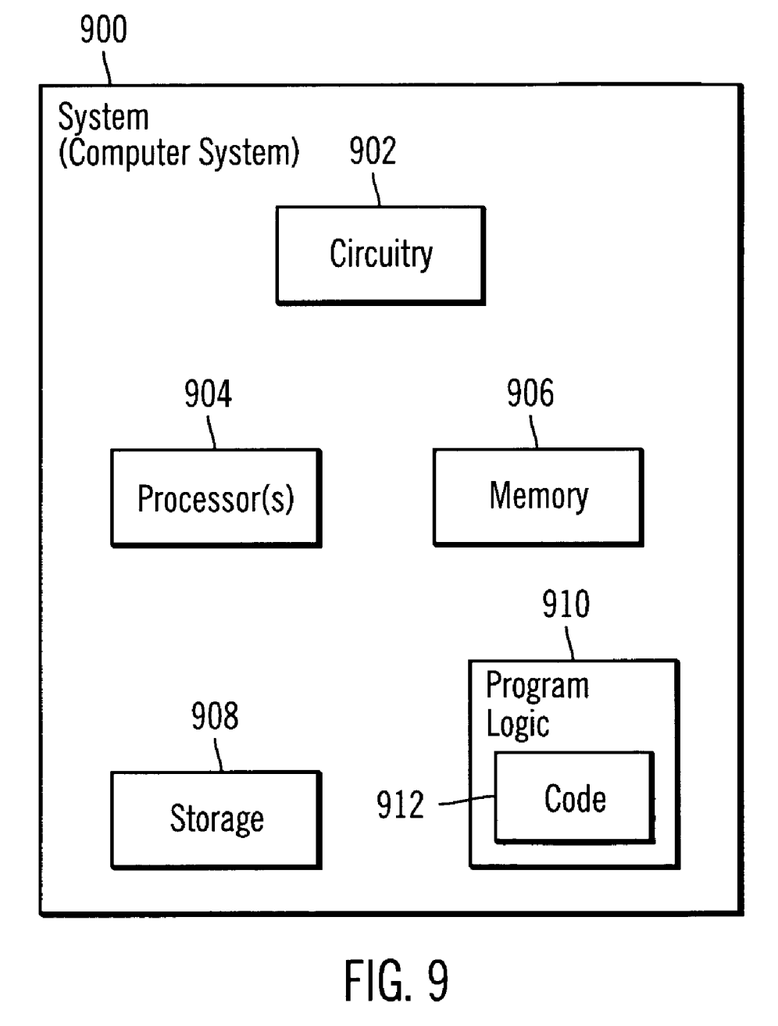
FIG. 9 illustrates the architecture of a computer system, wherein in certain embodiments the server and the clients of the computing environment of FIG. 1 may be implemented in accordance with the architecture of the computer system.

FIG. 9 illustrates an exemplary computer system 900, wherein in certain embodiments the server 102 and the client nodes 106a . . . 106n of the computing environment 100 of FIG. 1 may be implemented in accordance with the computer architecture of the computer system 900. The computer system 900 may also be referred to as a system, and may include a circuitry 902 that may in certain embodiments include a processor 904. The system 900 may also include a memory 906 (e.g., a volatile memory device), and storage 908. Certain elements of the system 900 may or may not be found in the server 102 and the client nodes 106a . . . 106n. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 5, 7, and 8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    maintaining a plurality of client nodes coupled to a server node, wherein the plurality of client nodes includes at least a first client node and a second client node;
    determining that a current object corresponding to the first client node has to be stored;
    determining, by the first client node, whether a base object corresponding to a current object exists on both the first client node and the server node;
    generating, by the first client node, a delta object by calculating a difference between the current object and the base object, in response to determining that the base object corresponding to the current object exists on both the first client node and the server node;
    sending, by the first client node, the generated delta object to the server, in response to determining by the server node that the generated delta object does not exist on the server node, wherein objects and representations of objects stored in the server node form a plurality of groups,
    wherein group relationships between the objects stored on the server are preserved while reducing redundancy among the objects stored on the server;
    referencing, by the server node, a previously stored delta object sent by the second client node, in response to determining by the server node that the generated delta object exists on the server node, wherein the previously stored delta object is included a group;
    determining a need for restoring to the first client node the group stored in the server node, wherein the group has been updated at a selected time at the server node, wherein the group includes selected objects sent to the server node by at least the first client node and the second client node, wherein any object that is already present in the server node is not sent once again to the server node by any client node of the plurality of client nodes; and
    restoring, by the server node to the first client node, the selected objects included in the group stored in the server node, by using at least the referenced previously stored delta object.

2. The method of claim 1, wherein a plurality of objects stored by the first and the second client nodes form at least one peer group, and wherein if one object of a peer group is deleted then the peer group is invalidated.

3. The method of claim 1, further comprising:
    maintaining node identifiers corresponding to client nodes;
    maintaining object identifiers corresponding to the objects;
    maintaining group identifiers corresponding to the plurality of groups;
    maintaining at least one group type corresponding to the plurality of groups; and
    processing the plurality of groups in a database based on the node identifiers, the object identifiers, the group identifiers, and the at least one group type.

4. A method for deploying computing infrastructure, comprising integrating computer-readable code into a computing system, wherein the code in combination with the computing system is capable of performing:
    maintaining a plurality of client nodes coupled to a server node, wherein the plurality of client nodes includes at least a first client node and a second client node;
    determining that a current object corresponding to the first client node has to be stored;
    determining, by the first client node, whether a base object corresponding to a current object exists on both the first client node and the server node;
    generating, by the first client node, a delta object by calculating a difference between the current object and the base object, in response to determining that the base object corresponding to the current object exists on both the first client node and the server node;
    sending, by the first client node, the generated delta object to the server, in response to determining by the server node that the generated delta object does not exist on the server node, wherein objects and representations of objects stored in the server node form a plurality of groups, wherein group relationships between the objects stored on the server are preserved while reducing redundancy among the objects stored on the server;
    referencing, by the server node, a previously stored delta object sent by the second client node, in response to determining by the server node that the generated delta object exists on the server node, wherein the previously stored delta object is included a group;
    determining a need for restoring to the first client node the group stored in the server node, wherein the group has been updated at a selected time at the server node, wherein the group includes selected objects sent to the server node by at least the first client node and the second client node, wherein any object that is already present in the server node is not sent once again to the server node by any client node of the plurality of client nodes; and
    restoring, by the server node to the first client node, the selected objects included in the group stored in the server node, by using at least referenced previously stored delta object.

5. The method for deploying computing infrastructure of claim 4, wherein a plurality of objects stored by the first and the second client nodes form at least one peer group, and wherein if one object of a peer group is deleted then the peer group is invalidated.

6. The method for deploying computing infrastructure of claim 4, further comprising:
maintaining node identifiers corresponding to client nodes;
maintaining object identifiers corresponding to the objects;
maintaining group identifiers corresponding to the plurality of groups;
maintaining at least one group type corresponding to the plurality of groups; and
processing the plurality of groups in a database based on the node identifiers, the object identifiers, the group identifiers, and the at least one group type.

7. A system, wherein a server node is coupled to a plurality of client nodes, the system comprising:
a memory; and
a processor coupled to the memory, wherein the processor performs operations, the operations comprising:
determining that a current object corresponding to a first client node has to be stored;
determining, by the first client node, whether a base object corresponding to a current object exists on both the first client node and the server node;
generating, by the first client node, a delta object by calculating a difference between the current object and the base object, in response to determining that the base object corresponding to the current object exists on both the first client node and the server node;
sending, by the first client node, the generated delta object to the server, in response to determining by the server node that the generated delta object does not exist on the server node, wherein objects and representations of objects stored in the server node form a plurality of groups, wherein group relationships between the objects stored on the server are preserved while reducing redundancy among the objects stored on the server;
referencing, by the server node, a previously stored delta object sent by a second client node, in response to determining by the server node that the generated delta object exists on the server node, wherein the previously stored delta object is included a group;
determining a need for restoring to the first client node the group stored in the server node, wherein the group has been updated at a selected time at the server node, wherein the group includes selected objects sent to the server node by at least the first client node and the second client node, wherein any object that is already present in the server node is not sent once again to the server node by any client node of the plurality of client nodes; and
restoring, by the server node to the first client node, the selected objects included in the group stored in the server node, by using at least referenced previously stored delta object.

8. The system of claim 7, wherein a plurality of objects stored by the first and the second client nodes form at least one peer group, and wherein if one object of a peer group is deleted then the peer group is invalidated.

9. The system of claim 7, the operations further comprising:
maintaining node identifiers corresponding to client nodes;
maintaining object identifiers corresponding to the objects;
maintaining group identifiers corresponding to the plurality of groups;
maintaining at least one group type corresponding to the plurality of groups; and
processing the plurality of groups in a database based on the node identifiers, the object identifiers, the group identifiers, and the at least one group type.

10. A computer readable storage medium, wherein the computer readable storage medium includes code for controlling a server node that is coupled to a plurality of client nodes, wherein the code when executed by a processor causes operations, the operations comprising:
determining that a current object corresponding to a first client node has to be stored;
determining, by the first client node, whether a base object corresponding to a current object exists on both the first client node and the server node;
generating, by the first client node, a delta object by calculating a difference between the current object and the base object, in response to determining that the base object corresponding to the current object exists on both the first client node and the server node;
sending, by the first client node, the generated delta object to the server, in response to determining by the server node that the generated delta object does not exist on the server node, wherein objects and representations of objects stored in the server node form a plurality of groups, wherein group relationships between the objects stored on the server are preserved while reducing redundancy among the objects stored on the server;
referencing, by the server node, a previously stored delta object sent by a second client node, in response to determining by the server node that the generated delta object exists on the server node, wherein the previously stored delta object is included a group;
determining a need for restoring to the first client node the group stored in the server node, wherein the group has been updated at a selected time at the server node, wherein the group includes selected objects sent to the server node by at least the first client node and the second client node, wherein any object that is already present in the server node is not sent once again to the server node by any client node of the plurality of client nodes; and
restoring, by the server node to the first client node, the selected objects included in the group stored in the server node, by using at least referenced previously stored delta object.

11. The computer readable storage medium of claim 10, wherein a plurality of objects stored by the first and the second client nodes form at least one peer group, and wherein if one object of a peer group is deleted then the peer group is invalidated.

12. The computer readable storage medium of claim 10, the operations further comprising:
maintaining node identifiers corresponding to client nodes;
maintaining object identifiers corresponding to the objects;
maintaining group identifiers corresponding to the plurality of groups;
maintaining at least one group type corresponding to the plurality of groups; and
processing the plurality of groups in a database based on the node identifiers, the object identifiers, the group identifiers, and the at least one group type.

13. A system, comprising:
a server node;
a plurality of client nodes coupled to the server node;
means for determining that a current object corresponding to a first client node has to be stored;
means for determining, by the first client node, whether a base object corresponding to a current object exists on both the first client node and the server node;

means for generating, by the first client node, a delta object by calculating a difference between the current object and the base object, in response to determining that the base object corresponding to the current object exists on both the first client node and the server node;

means for sending, by the first client node, the generated delta object to the server, in response to determining by the server node that the generated delta object does not exist on the server node, wherein objects and representations of objects stored in the server node form a plurality of groups, wherein group relationships between the objects stored on the server are preserved while reducing redundancy among the objects stored on the server;

means for referencing, by the server node, a previously stored delta object sent by a second client node, in response to determining by the server node that the generated delta object exists on the server node, wherein the previously stored delta object is included a group;

means for determining a need for restoring to the first client node the group stored in the server node, wherein the group has been updated at a selected time at the server node, wherein the group includes selected objects sent to the server node by at least the first client node and the second client node, wherein any object that is already present in the server node is not sent once again to the server node by any client node of the plurality of client nodes; and means for restoring, by the server node to the first client node, the selected objects included in the group stored in the server node, by using at least referenced previously stored delta object.

14. The system of claim 13, wherein a plurality of objects stored by the first and the second client nodes form at least one peer group, and wherein if one object of a peer group is deleted then the peer group is invalidated.

15. The system of claim 13, the system further comprising:

means for maintaining node identifiers corresponding to client nodes;

means for maintaining object identifiers corresponding to the objects;

means for maintaining group identifiers corresponding to the plurality of groups;

means for maintaining at least one group type corresponding to the plurality of groups; and means for processing the plurality of groups in a database based on the node identifiers, the object identifiers, the group identifiers, and the at least one group type.

* * * * *